United States Patent [19]

Nomiyama et al.

[11] Patent Number: 4,628,542

[45] Date of Patent: Dec. 9, 1986

[54] MODULATED TEA LASER RECEIVER

[75] Inventors: Neal T. Nomiyama, Sunnydale, Calif.; Robert S. Rohde, Alexandria; Rudolph G. Buser, Springfield, both of Va.

[73] Assignee: The United States of America as represented by the Secretary of the Army, Washington, D.C.

[21] Appl. No.: 714,234

[22] Filed: Mar. 21, 1985

[51] Int. Cl.$^4$ .............................................. H04B 9/00
[52] U.S. Cl. ............................ 455/619; 250/214 AG; 455/617
[58] Field of Search ............... 455/617, 619, 607, 606; 250/214 A, 214 AG, 214 B, 214 RC; 330/59, 308

[56] References Cited

U.S. PATENT DOCUMENTS 3,999,060 12/1976 Skagerlund .................. 250/214 AG
4,393,517 7/1983 Buser et al. ......................... 455/618

OTHER PUBLICATIONS

MacDonald et al.–"Researchers Open Pathway'-'–Canadian Electronics Eng.–Apr. 1980–pp. 18–20.
Funahashi et al.–"Baseband Video Transmission System"–Nat. Tech. Report, vol. 27, No. 5, Oct. 1981, pp. 638–644.
Brosio et al., "A Low Consumption Light Powered Telephone"–Conf. 6th European Conf. on Opt. Comm., York Eng., 16–19, Sep. 1980, pp. 242–245.

Primary Examiner—Joseph A. Orsino, Jr.
Attorney, Agent, or Firm—Max L. Harwell; Aubrey J. Dunn; Anthony T. Lane

[57] ABSTRACT

An optical receiver for a pulsed TEA laser output. The output has a high-amplitude portion followed by a lower amplitude tail; information is modulated onto the tail. For the high-amplitude output portion, a photodetector in the receiver is biased to low sensitivity; during the tail of the laser, the bias is increased to increase the photodetector sensitivity.

2 Claims, 1 Drawing Figure

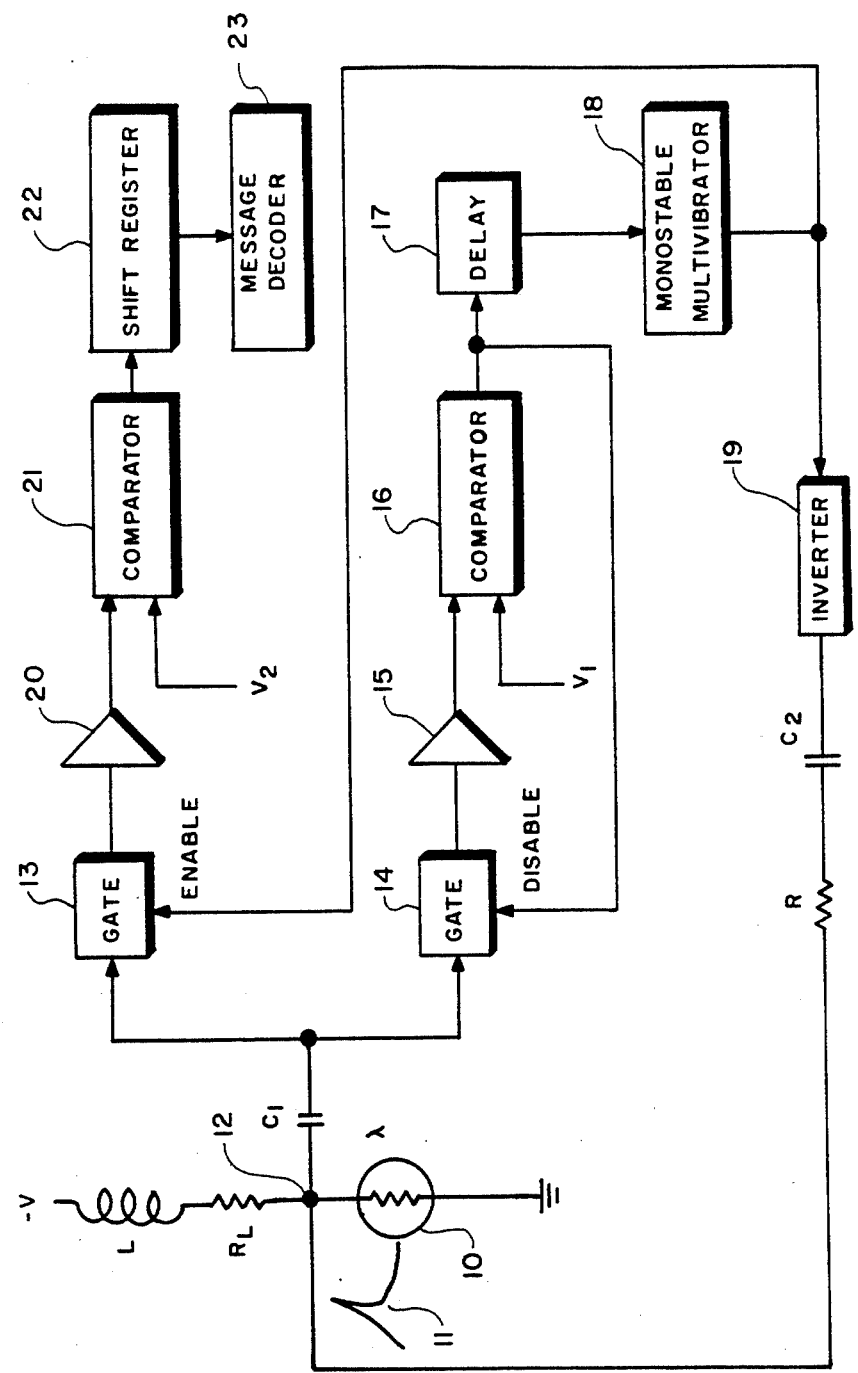

MODULATED TEA LASER RECEIVER

The invention described herein may be manufactured, used, and licensed by the U.S. Government for governmental purposes without the payment of any royalties thereon.

BACKGROUND OF THE INVENTION

This invention is in the field of receivers for information modulated onto light waves. In particular, it concerns information carried by the "tail" of a TEA laser. Light-wave communications are well known in the art, including those systems employing lasers as the channel. Such systems, when using lasers, are usually point-to-point using low-power, continuous-wave (CW) laser outputs modulated by some electro-optical device. Pulsed laser outputs are not normally used because of the difficulties of modulating extremely short (and often high peak power) output pulses. The pulsed TEA laser, however, has an output envelope which may be used to advantage. U.S. Pat. No. 4,393,517, by the present inventors and one other, shows a TEA laser pulse-code transmitter. This envelope has a fast-rise-time and high-intensity pulse which rapidly decays into a relatively long low-intensity tail. A receiver for receiving CW lasers might be damaged by such a high-intensity pulse, or at least temporarily blinded. The ideal requirements for a receiver of information on a TEA laser output are: low sensitivity during the high-intensity portion of the output, and high sensitivity during the tail thereof. The instant invention meets these requirements.

SUMMARY OF THE INVENTION

The invention is a receiver for information modulated onto the tail portion of a pulsed TEA laser. The receiver includes a photodetector which can be biased to either a high-sensitivity or to a low-sensitivity rate. In the absence of a laser pulse, and during the high-intensity portion of the pulse, the photodetector is biased to low sensitivity. When the photodetector detects the high-intensity portion of the laser pulse, a timing circuit operates (after a delay) to bias the photodetector to high sensitivity, and to connect a demodulator to the photodetector output.

BRIEF DESCRIPTION OF THE DRAWING

The single drawing FIGURE is a schematic diagram of the invention.

DESCRIPTION OF PREFERRED EMBODIMENT OF INVENTION

The invention may be best understood if this description is taken in conjunction with the drawing. In the drawing, a photodetector 10 is exposed to radiation 11 from a pulsed TEA laser. Although not shown, it should be understood that a telescope or lens may be used to focus 11 onto 10. Radiation 11 will have an envelope (as shown) with a relatively short and high-amplitude tail. The amplitude of the pulse portion is such that it might damage a sensitive photodetector. A voltage -V biases photodetector 10 through choke L and load resistor $R_L$ such that 10 is in a low-sensitivity state during the absence of radiation 11 and during the high-amplitude portion of 11. Photodetector 10 is a photoresistor or photoconductor which varies in resistance (or conductivity) in response to radiation 11, such that the voltage at junction 12 likewise varies. These variations are coupled by d-c blocking capacitor $C_1$ to signal inputs of gates 13 and 14. Gate 13 is normally closed, and 14 is normally open, such that a signal coupled by $C_1$ passes through 14, is amplified by amplifier 15, and passes to comparator 16. This comparator compares the output of 15 to a reference voltage $V_1$ and produces an output when the output of 15 equals or exceeds $V_1$. The output of 16 feeds both a disable input to gate 14 (to close the gate) and delay 17. The output of 17 operates monostable multivibrator 18, which multivibrator produces an output pulse. This pulse feeds inverter 19, and the enable input of gate 13. The output of 19 feeds through coupling capacitor $C_2$ and current-limiting resistor R to junction 12, and more highly biases photodetector 10 than it is biased by -V. This higher bias makes 10 more sensitive. The delay in the circuit including 14–19, $C_2$ and R is such that 10's sensitivity only increases after the high-amplitude pulse portion of radiation 11. The photodetector is thus biased to high sensitivity during the tail portion of radiation 11 while, the information of interest being modulated onto said tail portion. Gate 13, which was enabled by the output of 18, passes the signals from 10 to amplifier 20. The output of 20 is a signal input to comparator 21; $V_2$ is a reference input thereto. When the signal equals or exceeds $V_2$, 21 has an output to shift register 22, which stores the signal on the tail of radiation 11. This signal, which may be cryptographically encoded, is decoded by message decoder 23. The decoder is well known in the art, and is not, per se, necessary to the invention. An uncoded signal may be taken directly as the output of 22.

A receiver has thus been described which has a photodetector with a first (low) sensitivity during (and before) the high-amplitude pulse portion of a pulsed TEA laser output, and has a second (high) sensitivity during the tail of the laser output. Each of blocks 13–23 is well known in the art, but, taken together, provide a unique combination. Comparators 16 and 21, as examples, are Schmitt triggers or equivalent.

We claim:

1. A receiver for receiving information modulated onto the output of a pulsed TEA laser, wherein said output has an envelope shape including a relatively short and high-amplitude pulse portion followed by a relatively long and low-amplitude tail portion, whereby said information is amplitude-modulated onto said tail, said receiver including:

a photodetector responsive to the output of said laser, having a high-sensitivity state and a low-sensitivity state, and having an output;

means for switching said photodetector between said states, whereby said photodetector is in said low-sensitivity state in the absence of an output from said laser and during said pulse portion, and in said high-sensitivity state during said tail portion; and energizable means for demodulating said output of said photodetector, wherein said means for switching includes means for biasing said photodetector to said low-sensitivity state and means responsive to the output of said photodetector during said pulse portion of said laser output for supplying, after a predetermined interval, a first signal for energizing said energizable means for demodulating, and a second signal for biasing said photodetector to said high-sensitivity state.

2. The receiver as set forth in claim 1 wherein said means for switching includes:

a normally-open first gate connected to the output of said photodectector and having a disable input;

first comparator means having a reference signal input and having a signal input connected to said gate for receiving the output of said photodetector when said gate is open, and having an output when said output of said photodetector equals or exceeds said reference signal whereby said output is an input to said disable input of said gate;

a monostable multivibrator having at least a trigger input and a pulse output;

delay means connected between said trigger input and said output of said comparator means, and pulse inverting means between said output of said monostable multivibrator and said photodetector;

and whereby said means for demodulating includes:

a normally-closed second gate connected to the output of said photodetector and having an enable input;

second comparator means having a reference signal input and having a signal input connected to said second gate for receiving the output of said photodetector when said second gate is gated open by a signal on its enable input and having an output when said output of said photodetector equals or exceeds its reference signal, whereby said output of said multivibrator is connected to said enable input; and message decoder means connected to said output of said second comparator.

* * * * *